R. J. ROBERTS.
FLEXIBLE SLIDE RULE.
APPLICATION FILED APR. 22, 1904.
937,863.
Patented Oct. 26, 1909.
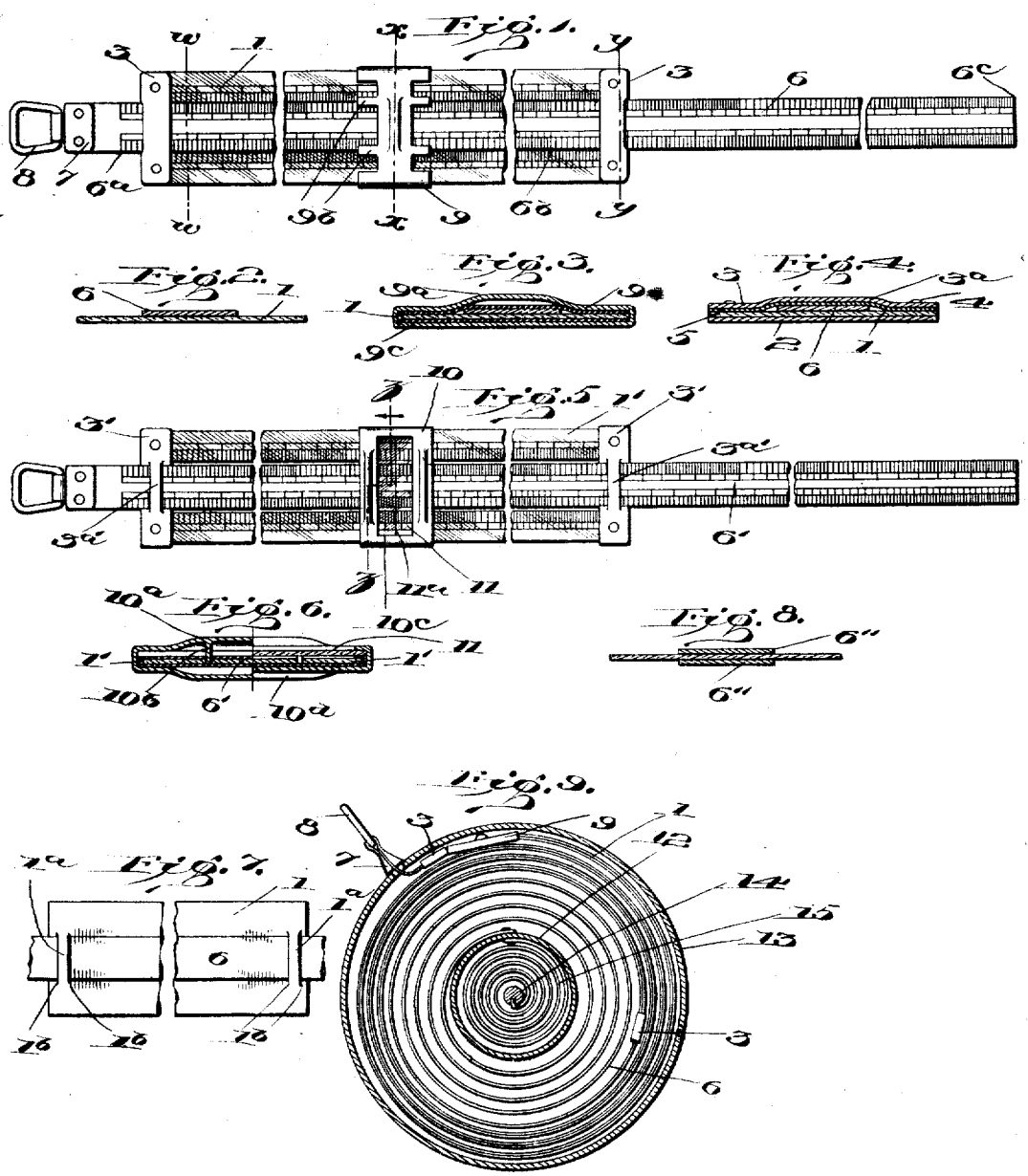

UNITED STATES PATENT OFFICE.

ROBERT J. ROBERTS, OF NEW YORK, N. Y.

FLEXIBLE SLIDE-RULE.

937,863. Specification of Letters Patent. Patented Oct. 26, 1909.

Application filed April 22, 1904. Serial No. 204,323.

*To all whom it may concern:*

Be it known that I, ROBERT J. ROBERTS, residing at New York, in the county of New York and State of New York, have invented certain new and useful Improvements in Flexible Slide-Rules, of which the following is a full, clear, and exact description, such as will enable others skilled in the art to which it appertains to make and use the same.

This invention relates to slide rules.

One of the objects thereof is to provide a slide rule which shall be flexible and adapted to be coiled within a case.

Another object is to provide a device of the above type having a duplicate graduated surface upon the slide thereof.

Another object is to provide means to prevent the wearing of the rider upon the graduated surface.

Other objects will be in part obvious and in part pointed out hereinafter.

The invention accordingly consists in the features of construction, combinations of elements and arrangement of parts which will be hereinafter described and the scope of the application thereof indicated in the following claims.

In the accompanying drawings which illustrate several of various possible embodiments of my invention, Figure 1 is a plan of a flexible slide rule with parts of the slide and rule broken away. Fig. 2 is a cross section on the line *w—w* of Fig. 1. Fig. 3 is a cross section taken on the line *x—x* of Fig. 1. Fig. 4 is a cross section on the line *y—y* of Fig. 1. Fig. 5 is a plan of a slightly different embodiment of my invention, parts of the slide and rule thereof being broken away. Fig. 6 is a cross section of the same, taken on the line *z—z* of Fig. 5. Fig. 7 is a plan of a portion of a rule having clips integral therewith. Fig. 8 is a cross section of a slightly different embodiment the plan of which would be identical with that shown in Fig. 1. Fig. 9 is a cross section of a casing, showing the slide rule coiled therein.

Similar reference characters are used to refer to similar parts throughout the several views.

Referring now to Fig. 1, 1 represents a strip of flexible material the surface of which is graduated, as is customary with devices of this type. This may be formed of any desired flexible or pliable material, but transparent celluloid has been found to be peculiarly adapted for this purpose. The ends of strip 1, which may be termed the "rule", are secured within clips formed as shown in Fig. 4 and comprising members 2 and 3. The lower member 2 is substantially co-extensive in width with rule 1 and is positioned below the same, and directly above is the corresponding member 3 having a slightly raised central portion $3^a$. Members 2 and 3 are secured to one another and to rule 1 by means of rivets 4, or in any other desired manner, and member 3 is preferably provided with a lining 5, of felt or other desired material, for the purpose of preventing wear upon the graduated surfaces.

Mounted upon rule 1 is what may be termed a "slide" 6, preferably of material having characteristics similar to celluloid and preferably relatively opaque as compared with the rule. This member passes through the openings formed by the raised central portions $3^a$ of the above-described clips as shown in Fig. 4. Slide 6 is substantially equal in length to twice the length of rule 1. The graduations of one-half of the slide are similar to those upon the corresponding part of slide rules of ordinary construction and are duplicated upon the other half of the slide. As shown in Fig. 1, the graduations from $6^a$ to $6^b$ are identical with those from $6^b$ to $6^c$, and no intervening space occurs between the two sets of graduations. Obviously, the length of the slide could be any multiple of the length of the rule and the number of sets of graduations increased in a corresponding manner. To the end of slide 6 is secured a small metal stop 7 to which is attached a bail 8, for a purpose hereinafter explained.

Mounted upon rule 1 and slide 6 is a rider 9. This rider may be formed, if desired, out of a single piece of material, and entirely surrounds the slide and rule, as shown in Fig. 3. A rib $9^a$ is preferably formed upon the top of rider 9 for stiffening purposes and facilitates the manual movement thereof, and lateral projections $9^b$ are provided as shown in order to render the reading accurate. Upon the upper and lower surfaces of the slide rule and secured within the rider is preferably positioned a lining 9ᶜ for the purpose hereinbefore described in relation to the lining of the end clips.

In Fig. 5 is shown a slightly different embodiment of my invention, in which the "rule" or part corresponding to strip 1 in the above-described embodiment is formed of two portions 1'. The ends of the strips 1' are secured within clips 3', similar to those previously described except that the raised central portions 3ᵃ' are of reduced width and the lateral portions which are cut away extend downwardly, as shown at 3ᵇ. These downwardly projecting portions serve as abutments for the edges of a slide 6' identical with that above described. This slide is mounted between strips 1' and passes beneath the raised portions 3ᵃ' of clips 3'. Rider 10, which is adapted to travel upon this rule, differs from that above described in several particulars. The upper surface of the rider is provided with two transverse ribs 10ᵃ similar in construction and function to rib 9ᵃ above described and provided with downwardly extending lugs 10ᵇ. These lugs, of which there are two under each rib, serve properly to space slide 6' and the strips 1', 1'. Between ribs 10ᵃ is a transverse opening 10ᶜ and mounted therein is a glass 11 provided with a hair line 11ᵃ for use in the well-known manner. Rider 10 is preferably lined with felt where it contacts with strips 1' and slide 6', as shown at 10ᵈ.

In Fig. 7 is shown a means of holding the slide in its proper position with relation to the rule by means of a raised portion 1ᵃ formed by means of a pair of parallel incisions 1ᵇ in the rule.

Fig. 8 is a cross section of an embodiment differing very slightly from that shown in Fig. 1, in which the slide 6'' is duplicated and the graduations may also, if desired, be placed upon both slides and both sides of the rule. This arrangement results in a more compact construction in which the rule is normally held in closer engagement with the slide.

In Fig. 9 is shown a slide rule, which may be of any of the above types, coiled upon a drum 12 in a casing 13. Drum 12 is free from the casing and is connected to a pin 14 fixed thereto by means of spiral spring 15. In the view shown, spring 15 is under slight tension and holds the previously mentioned stop 7 firmly against the side of the casing.

As the manner of using the several described embodiments is identical, it will be described with reference to one only. If the rule is used in connection with a casing, it is withdrawn therefrom by means of bail 8, thereby placing spring 15 under an increased tension. The rule is now preferably laid upon a flat surface and used in the ordinary manner, as will be obvious.

A marked advantage may here be noted in connection with the above embodiments of my invention. It is often necessary, in computing by means of the ordinary slide rule, to move the slide throughout a distance equal to the length of the graduated portion in order to place a certain point or points of this scale within the limits of the graduated portion of the rule. With the above-described devices this operation is rendered unnecessary, the duplicate scale upon the slide taking the place of and performing all the functions of a single scale whenever the slide must, for certain uses, be transposed throughout a distance equal to its own graduated length. When it is desired to store the same, if the case be used, the slide is simply released and is automatically coiled within case 13 by spring 15.

The reverse side of slide 6, or its equivalent in the other above-described embodiments, is preferably graduated in such manner as to adapt it for use in finding the functions of angles and logarithms of numbers, and the same may be read with relation to the graduations upon rule 1 through the transparent material of which the same is composed. In the embodiment shown in Fig. 5 the strips 1', 1' may be, if desired, of opaque material having both sides graduated.

It will thus be seen that I have provided a device not subject to warping or bending and possessing great advantages in matters of convenience and portability. The several parts are few, simple and inexpensive, and the construction is durable and efficient. Also, it will be noted that by the use of an opaque slide and translucent rule a contrast between the two scales results which will tend to facilitate reading. It will also be noted that the lining of the clips and the rider reduces the wear between the same and the graduated surfaces and thus tends to prevent obliteration of the scale. Also, the lined rider is better adapted to hold its position than a similar device not provided with a lining.

As many changes could be made in the above construction and many apparently widely different embodiments of my invention could be made without departing from the scope thereof, I intend that all matter contained in the above description and shown in the accompanying drawings shall be interpreted as illustrative and not in a limiting sense.

I desire it also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:—

1. In combination, a rule, graduations upon said rule, a slide, graduations upon said slide, the length of the graduated portion of said slide being a multiple of that of the graduated portion of said rule, and a case into which said rule and said slide are adapted to be coiled.

2. In combination, a member adapted for use as a rule, a member adapted for use as a slide, one of said members being opaque and the other being translucent, and a case into which said members are adapted to be coiled.

3. In combination, a slide rule, a rider, a lining in said rider adapted to protect said slide rule, and a case into which said slide rule is adapted to be coiled.

4. In combination, a slide rule, a case, said slide rule being adapted to be coiled within said case, a rider adapted to co-act with said slide rule, and a protective lining in said rider.

5. In combination, a flexible rule, graduations upon said rule, a flexible slide, graduations upon said slide, the length of the graduated portion of said slide being a multiple of the length of the graduated portion of said rule, and a case into which said rule and said slide are adapted to be coiled.

6. In combination, a flexible rule, graduations upon the same, a flexible slide, graduations upon the same, the length of the graduated portion of said slide being twice the length of the graduated portion of said rule, and a case into which said rule and said slide are adapted to be coiled.

7. In combination, a flexible slide rule, a rider, a lining in said rider adapted to protect said slide rule, and a case into which said slide rule is adapted to be coiled.

8. In combination, a member adapted for use as a rule, a member adapted for use as a slide, one of said members being opaque and the other being translucent, a case into which said members are adapted to be coiled, a rider adapted to co-act with said members, and a protective lining in said rider.

9. In combination, a rule, graduations upon said rule, a slide, graduations upon said slide, the length of the graduated portion of said slide being a multiple of the length of the graduated portion of said rule, a case into which said rule and said slide are adapted to be coiled, a rider adapted to co-act with said rule, and a protective lining in said rider.

10. In combination, a member adapted for use as a rule, graduations upon the same, a member adapted for use as a slide, graduations upon the same, the length of the graduated portion of said slide being a multiple of the length of the graduated portion of said rule and one of said members being translucent and the other being opaque, and a case into which said members are adapted to be coiled.

11. In combination, a flexible rule, graduations upon said rule, a flexible slide, graduations upon said slide, the length of the graduated portion of said slide being a multiple of the graduated portion of said rule, a case into which said rule and said slide are adapted to be coiled, a rider adapted to co-act with said rule and said slide, and a protective lining in said rider.

12. In combination, a flexible member adapted for use as a rule, graduations upon the same, a flexible member adapted for use as a slide, graduations upon the same, the length of the graduated portion of said second-mentioned member being a multiple of the length of the graduated portion of said rule and one of said members being translucent and the other being opaque, and a case into which said members are adapted to be coiled.

13. In combination, a member adapted for use as a rule, graduations upon the same, a member adapted for use as a slide, graduation upon the same, the length of the graduated portion of said member adapted for use as a slide being a multiple of the length of the graduated portion of said first-mentioned member and one of said members being translucent and the other being opaque, a case into which said members are adapted to be coiled, a rider adapted to co-act with said members, and a protective lining in said rider.

14. In combination, a flexible member adapted for use as a rule, graduations upon the same, a flexible member adapted for use as a slide, graduations upon the same, the length of the graduated portion of said second-mentioned member being a multiple of the length of the graduated portion of said first-mentioned member, one of said members being opaque and the other being translucent, a case into which said members are adapted to be coiled, a rider adapted to co-act with said members, and a protective lining in said rider.

15. In combination, a coilable rule, and a coilable slide coacting therewith, said slide being divided into a plurality of sections each duplicate of the other, and adapted to be connected at one end to a winding drum, said rule being capable of being moved bodily from one end of said slide to the other.

16. In combination, a continuously graduated coilable rule, and a coilable slide coacting therewith, said slide being adapted to be connected to a winding drum at one end and being at least twice the length of the rule, said rule being bodily movable from one end to the other of said slide.

17. In combination, a slide rule comprising a coilable slide, a coilable rule coacting therewith, and a rider mounted upon and slidable along said rule and so formed and constituted as to permit coiling of said rule and a casing adapted to receive said rule, slide and rider in coiled condition.

In testimony whereof I affix my signature, in the presence of two witnesses.

ROBERT J. ROBERTS.

Witnesses:
H. S. DUELL,
F. P. WARFIELD.